Figure 1:
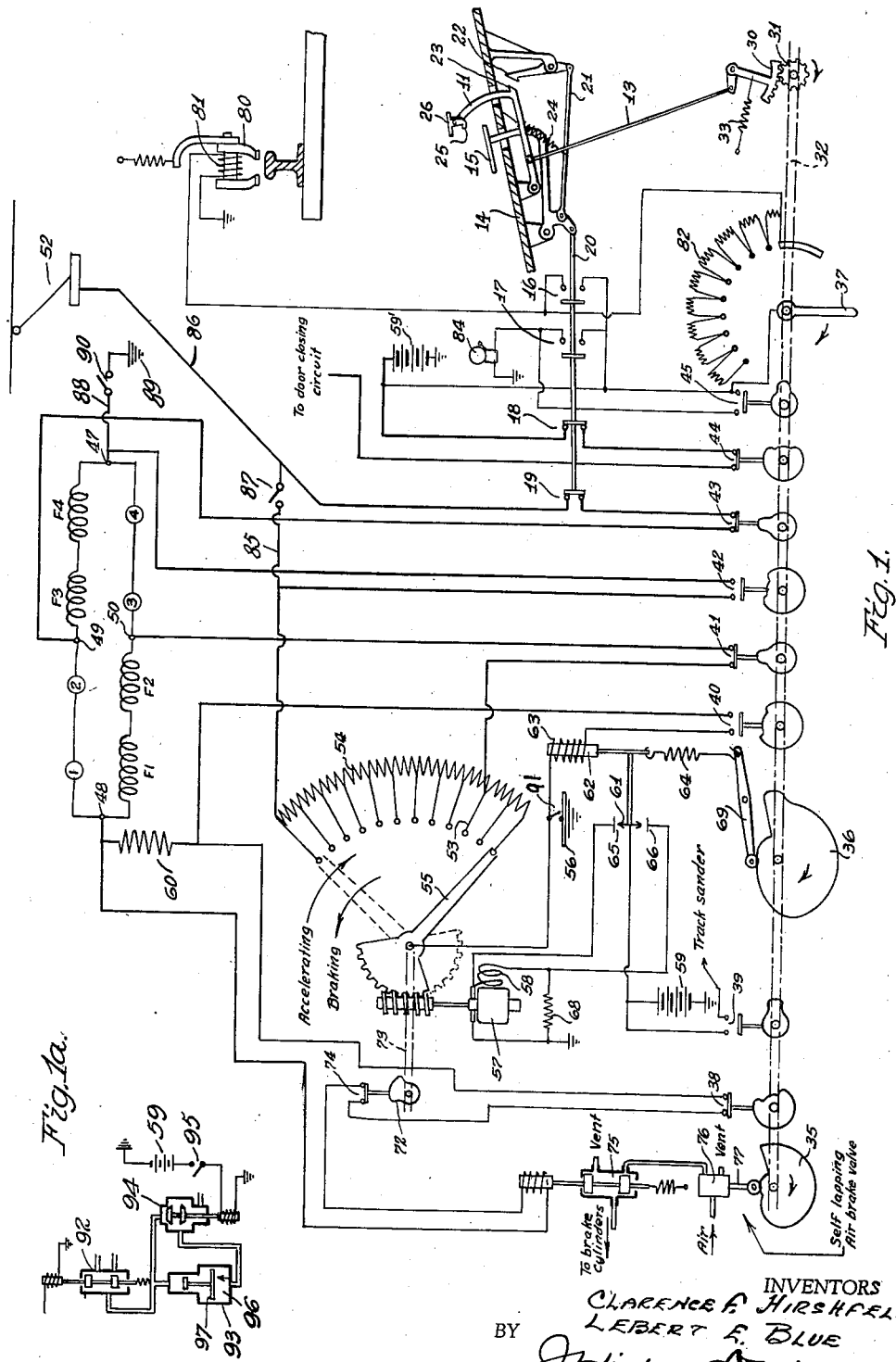

May 27, 1941.                L. E. BLUE ET AL                2,243,068
                              BRAKING SYSTEM
                           Filed July 26, 1937            2 Sheets-Sheet 2

INVENTORS
CLARENCE F. HIRSHFELD
LEBERT E. BLUE
BY
ATTORNEY.

Patented May 27, 1941

2,243,068

UNITED STATES PATENT OFFICE 2,243,068

BRAKING SYSTEM

Lebert E. Blue, New York, N. Y., and Clarence F. Hirshfeld, Detroit, Mich., assignors to The Transit Research Corporation, New York, N. Y., a corporation of New York Application July 26, 1937, Serial No. 155,598

5 Claims. (Cl. 303—3)

This invention relates to braking systems for electrically propelled rail vehicles, such as street cars and multiple unit trains, and particularly to vehicles of the above classification provided with wheels which would be injured by excessive heat. The most modern rail vehicles are provided with wheels containing rubber cushioning or springing elements, and these elements would be damaged by the heat generated if the principal means of stopping the vehicle were brake shoes applied to the wheels. In order to preserve the rubber in the wheels, it is necessary to accomplish most of the retardation of the vehicle by other means, such as track brakes, dynamic braking, or brakes on the axles or propeller shafts.

These various braking means each have their advantages and disadvantages. Air, hydraulic or mechanical brakes on the wheels, axles or propeller shafts are effective at all speeds and also when the vehicle is stopped, and their application can be accurately controlled, but their braking effort is limited by the co-efficient of friction between the wheels and the track and they require automatic control mechanism to prevent them from locking the wheels and wearing them flat when maximum braking effort is required. Moreover, brakes on the wheels heat them and excessive heat shortens the life of the resilient wheels used on modern street rail vehicles. Dynamic braking causes practically no wear of wheels, tracks, or brake shoes, but is ineffective at low speeds, and the maximum braking effort is limited by the co-efficient of friction between the wheels and the track. Magnetic track brakes can be made as powerful as desired, but they wear the tracks, and they are not ordinarily relied upon as the sole braking means because they require a continued supply of current and become inoperative when the current to them fails.

The principal object of the present invention is to provide a braking system incorporating two or more of the above types of braking means and arranged so that the combination of braking means will have little or none of the disadvantages of the separate means while retaining their individual advantages.

Another object of the present invention is to provide a braking system embodying air, hydraulic or other type of mechanical wheel brakes, dynamic braking, track brakes, and a control means which is arranged so that normal braking is done by dynamic braking until the speed is reduced to a point at which dynamic braking is ineffective, whereupon the mechanical wheel brakes come into action to complete the retardation, and in which the control means are arranged so that the track brakes come into operation whenever severe braking is required.

Another object of this invention is to provide a braking system employing a plurality of different types of braking means controlled with proper coordination by a single control member.

Another object of this invention is to provide an interlock between a brake control member and a "dead man" control member which, after the brakes are applied, will hold them applied until it is desired to start the car.

Another object of this invention is to provide a complex braking system operated by a single control member and arranged so that the various braking means are applied selectively during normal braking but all are applied to their fullest extent when the control member is moved to its extreme position.

Another object of this invention is to provide a complex braking system including braking means which are operative irrespective of the speed of the car but which cause wear when the car is moving and to provide other braking means which do not cause wear but which are operative only when the car is moving, the braking system being arranged so that the braking means which cause wear when the car is moving are automatically locked out of action whenever the other braking means is effective enough.

Another object of this invention is to provide a braking system employing more than one kind of brake and having simple means of latching the brake pedal or control member in a position to apply only the brakes which can be kept applied without a continuous supply of power so that the car can be safely and economically parked for a period of several hours or more.

Another object of this invention is to provide a simple means of latching the brake pedal or control member with all braking means applied and power turned off so that, in case of an imminent head-on collision, the operator can go to a safer place than the forward platform of the car and leave the brakes on full.

Another object of this invention is to provide a simple means for warning the operator whenever he is about to leave the car without leaving the brakes properly applied.

Figure 2:
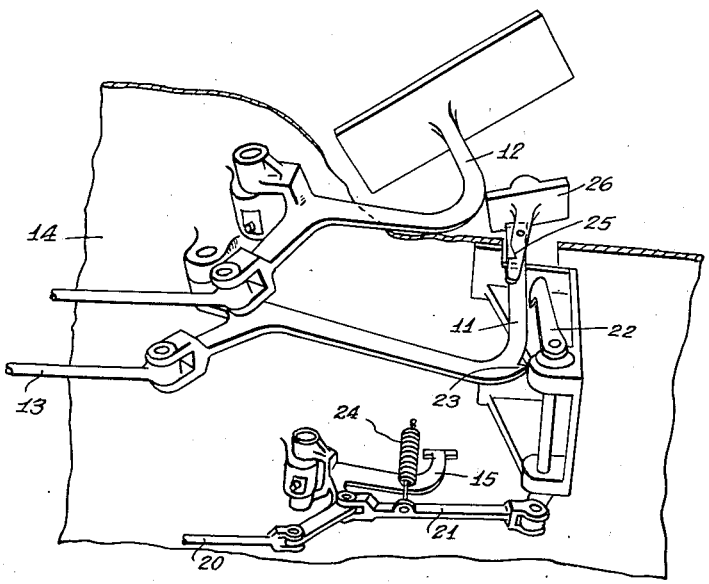
Figure 3:
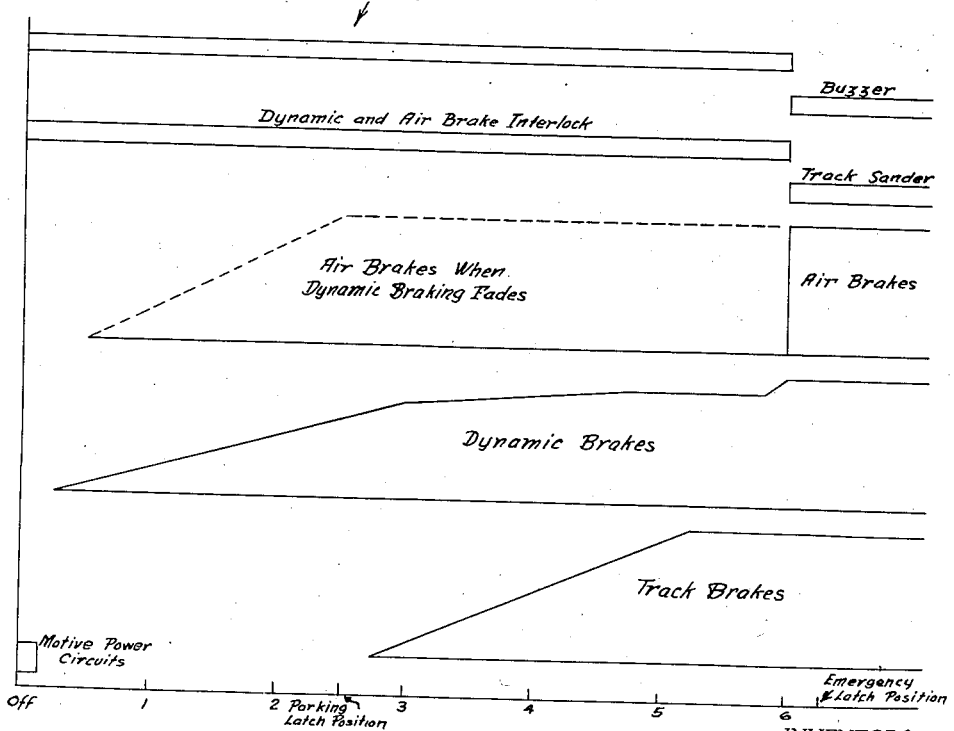

Other objects of this invention will appear in the following description and appended claims, reference being had to the accompanying drawings in which Figure 1 is a simplified schematic diagram of the braking system, Figure 1a is a similar diagram of the door closing system, Figure 2 is a perspective view looking up at the pedals from underneath the car floor, Figure 3 is a graph or diagram showing what occurs as the brake pedal or control member is moved from its off position to its full-on emergency stop position.

The preferred embodiment of the present invention comprises a brake pedal 11, placed alongside a power pedal 12, at the front of an electric rail vehicle where it is convenient to the operator's foot, as shown in Fig. 2. The brake pedal 11 is connected to a brake controller by means of a link 13 extending back under the floor 14 of the vehicle and is associated with a "dead man" or foot interlock pedal 15. The foot interlock pedal 15 operates an interlock controller (represented by the switches 16, 17, 18 and 19 in Figure 1), through a link 20 and is connected by another link 21 to a parking latch 22 adjacent the brake pedal 11. The latch 22 is placed so as to engage a detent 23 on the brake pedal 11 when the latter is partly depressed and the foot interlock pedal 15 is released and to hold the brake pedal 11 in that position and at the same time to hold the foot interlock or "dead man" pedal 15 from rising to its fully released position under the influence of a spring 24 connected to the link 21. Thus, if the brake pedal 11 is depressed, the foot interlock pedal 15 is then released and finally the brake pedal 11 is released, both pedals 11 and 15 will be held in approximately their mid-positions. The brake pedal 11 can also be held in its "full on" or fully depressed position by means of an emergency latch 25 carried by the pivoted foot pad 26 of the pedal and adapted to hook under the floor 14.

The effect of placing the brake pedal 11 in its various positions, including the two positions in which it can be latched, is shown in Figure 3. The initial movement of the brake pedal 11 disconnects the motive power from the motors and establishes electro-dynamic braking circuits. The electro-dynamic braking circuits may convert the motors into generators which will convert the kinetic energy of the moving car into electric energy and feed the electric energy back into the line, thus providing what is commonly termed regenerative braking, or dissipate the electric energy in resistances, thus providing what is commonly termed dynamic braking. Further movement of the pedal 11 progressively increases the effectiveness of the electro-dynamic braking and establishes and progressively increases a force or pressure for applying friction brakes for the wheels. These friction brakes may be air, hydraulic, or mechanical in type and may act directly upon the wheels, or indirectly through the axles, or any members such as the propeller or motor shafts which rotate with the wheels. The force for applying the friction brakes is not allowed to operate if the vehicle is moving fast enough for the electro-dynamic braking to be effective; a lockout is provided which prevents this force from acting until the fading or dying out of the electro-dynamic braking at low speeds makes the friction brakes necessary.

When the brake pedal is depressed a little less than half way, the electro-dynamic braking is near the maximum which can be used regularly without overheating the equipment and the force for applying the friction brakes is at its maximum. It is at this point that the parking latch 22 is arranged to hold the brake pedal, so that the vehicle can be left with the friction brakes full on. The friction brakes are used for parking the vehicle because they are effective when the vehicle is at rest, which is not true of the electro-dynamic, and require only a stored-up force and not a continuous supply of energy to apply them, as do magnetic track brakes.

As the brake pedal is depressed beyond the parking latch position, the amount of electro-dynamic braking is increased slightly and magnetic track brakes are progressively applied until, when the pedal is near its fully depressed position, the electro-dynamic braking is the maximum that can be used regularly and the track brakes are applied with the maximum force. The force for applying the friction brakes for the wheels is maintained at a maximum but is rendered ineffective by the lockout as long as the electro-dynamic brakes are effective. This position provides the maximum service braking.

For emergency braking, the pedal is depressed to its extreme position, in which position it can be locked by the emergency latch 25 if it seems inadvisable for the operator to remain at his post. In this position, the lockout operates so that the friction brakes for the wheels may or may not go on with full force irrespective of the electro-dynamic brakes, the amount of electro-dynamic braking is increased beyond what the equipment can stand in regular continuous service to the maximum that it can stand for a single short application as the magnetic track brakes are fully applied. At the same time, the circuits controlling the door closing motors are cut off so that the doors of the vehicle can be opened by hand if an accident should require it, a track sander is automatically actuated, and a buzzer or other signal is sounded to prevent the operator from inadvertently using the emergency latch as a parking latch. This exact sequence of operations is not a necessary characteristic of this invention, because minor variations can obviously be made. For example, if the dynamic braking is sufficiently powerful, the application of friction brakes for the wheels when the dynamic braking is already operating would only lock the wheels. Hence, one desirable variation from the above sequence of operation is to omit the application of the friction brakes to the wheels during emergency braking.

The above sequence of operations may be secured in many ways and with many different types of equipment but only one need be described to illustrate the invention. The one which has been chosen for this purpose is the preferred form which has proven very satisfactory in actual service and which is shown diagrammatically and considerably simplified in Figure 1. In this figure, many contactors, such as those in the motive power circuits, and their operating circuits have been shown as simple cam operated switches, motor resistances and track brake resistances of advanced design have been shown as simple rheostats with single contact arms, motor field shunting circuits and reversing circuits have been entirely omitted, all of the track brakes have been represented by a single one, a single storage battery has been shown twice, and many refinements not forming an essential part of the invention have been omitted. All this has been done in order to simplify the drawings, to make the invention less difficult to understand, and to simplify the explanation of one embodiment of it as much as possible. For similar reasons the following description and explanation will in many places adhere more closely to the diagrammatic showing than to the actual more complicated construction, but it is to be understood that the scope of the invention is not to be limited by such description but only by the claims at the end of this specification.

In the form of braking system shown in Figure 1, the arrangement of pedals described above is used although obviously a hand operated or other form of controller would fall within the broader aspects of the invention. The link 13 secured at one end to the brake pedal 11 is secured at the other end to a gear sector 30, which meshes with a pinion 31 on the shaft 32 of the brake controller shown for convenience at right angles to its actual position. A spring 33 acts to resiliently hold these various parts 11, 13, 30, 31 and 32 in their "off" position.

The shaft 32, as shown diagrammatically in Figure 1, carries an air brake cam 35, a dynamic brake cam 36, a track brake controller arm 37, and cams for operating a number of switches 38 to 45.

Four of the switches 38 to 45, namely a motor switch 41, a line switch 43 and two braking switches 40 and 42 serve to disconnect the motive power circuits and establish the dynamic braking circuits. The armatures 1, 2, 3, and 4 and the fields F1, F2, F3 and F4 of the four traction motors are connected in series in a closed loop, the armatures and fields being arranged in four successive pairs, and four points of connection 47 to 50 are provided between the four successive pairs. The four switches 40 to 43 referred to above are connected to these four points of connection 47 to 50 on the motor loop 1, 2, F3, F4, 4, 3, F2, F1 so that when one pair 41 and 43 of the switches is closed, the flow of current in the field and armature of each motor will be in one direction relative to each other and when the other pair 40 and 42 of switches is closed the flow will be in the other direction. By this means, the motors, which are of the conventional electric traction series type, are readily arranged to convert electric power into mechanical power for propulsion or mechanical power into electric power for dynamic braking. The circuit for regenerative braking is the same as for dynamic braking except that the current is fed back into the main power line instead of being dissipated in heat by resistances. Thus, a line 85 is connected into the circuit between one terminal of the switch 42 and the resistances 54 and to the main power line 86 by way of the line to the trolley 52 through the switch 87 which is open during normal running. Between the motors and the other side of the switch 42 a line 88 is connected at one end at 47 and at its other end to ground 89 through a manual switch 90 which is open during normal running. A further switch, closed during normal running, is provided at 91 adjacent the ground 56. Thus, when regenerative braking is desired the two switches 87 and 90 are closed and the switch 91 is opened. The switch 42 is open and the switch 40 is closed.

When the motors are used for propulsion, electric power is supplied to them from a trolley 52, third rail, or other source, the current flowing through the line switch 43 to one connection 49 on the motor loop, from the opposite connection 50 on the motor loop to the motor switch 41 and to a tap 53 near one end of a motor resistance 54. A movable arm 55 grounded at 56 and arranged to tap the motor resistance 54 at a large number of points completes the power circuit and serves to vary the amount of resistance 54 in the circuit. The arm 55 is moved by a pilot motor 57, 58 which is caused to rotate in one direction or the other or to remain stationary in accordance with the position of the power pedal 12 and the amount of current flowing through the motors. The means for accomplishing this forms no part of the present invention, so it need not be described or shown except insofar as it also forms a part of the braking system.

The power controller, which is not shown in the diagram, is connected to the power pedal 12 in Figure 2, and is arranged so that initial movement of the pedal establishes the power circuit shown in Figure 1 by means of suitable switches and contactors. When this circuit has been established, the arm 55 for varying the motor resistance 54 is in its dotted line position, the maximum resistance is in the circuit, and the voltage applied to the motors 1, 2, 3, 4 is at a minimum. As the power pedal 12 is depressed, the arm 55 is moved by the pilot motor 57, 58 in the direction shown by the arrow marked "accelerating," the resistance 54 is gradually cut out, and the voltage across the motors, and the exact position to which the arm 55 is moved depends both upon the position of the power pedal 12 and the current flowing through the motors 1, 2, 3 and 4.

When the motors 1, 2, 3 and 4 are used for dynamic braking, the power circuits are disconnected both by the power controller and by the switches 41 and 43 operated by the braking controller. The braking circuits are established by closing the braking switches 40 and 42, these switches connecting the motor resistance 54 between the two connections 47 and 48 on the motor loop 1, 2, F3, F4, 4, 3, F2, F1. This causes the motors 1, 2, 3 and 4 to act as generators driven by the vehicle wheels and to convert the kinetic energy of the car into electric energy and feed it into the resistance 54 and a permanent braking resistance 60 where it is dissipated as heat. The rate at which kinetic energy is converted into electric energy and then into heat determines the braking effect and is dependent upon the speed at which the motors 1, 2, 3 and 4 are turning and the amount of resistance 54 and 60 in the circuit. The resistance 54 in the circuit is varied by moving the motor resistance arm 55, the maximum resistance being provided when the arm 55 is in the position shown in full lines. To decrease the amount of resistance 54, the arm can be rotated in the direction of the arrow marked "braking," and this decrease allows a greater current to flow from and be generated by the traction motors 1, 2, 3 and 4, thus increasing the power which they take from the wheels of the vehicle and increasing the amount of dynamic braking.

The pilot motor 57, 58 is operated from a storage battery 59 and is controlled by a limit relay 61 to 66 which causes it to rotate in one direction or the other, or to remain stationary depending upon the position of the relay 61 to 66. The relay 61 to 66 comprises a floating contact member 61 carried by an armature 62 acted upon in one direction by a spotting coil or solenoid 63 and in the opposite direction by a spring 64. The floating contact member 61 cooperates with two fixed contacts 65 and 66 and forms a reversing switch for the pilot motor 57, 58. When the floating contact member 61 is carried in one direction and touches one fixed contact 65, current from the battery 59 will flow in one direction through the armature 57 and field 58 of the pilot motor, and when the floating contact member 61 is carried in the other direction and touches the other fixed contact 66, current from the battery 59 will flow in the same direction through the armature 57 of the pilot motor but in the opposite direction through the field 58. This reversal of current in the field 58 is obtained by connecting the armature 57, the field 58, and a resistance 68 in a loop grounded between the armature and the resistance and connecting the two fixed contacts 65 and 66 of the limit switch at opposite sides of the field 58.

The position of the floating contact member 61 of the limit switch is determined by the opposed forces exerted by the spotting coil 63 and the limit switch spring 64. The spotting coil 63 is in the dynamic braking circuit between the motors and the motor resistance 54, and the force which it exerts is proportioned to the current in the motors and therefore to the retarding force exerted by the motors on the vehicle. The force exerted by the limit switch spring 64 is determined by the dynamic brake cam 36 carried on the controller shaft 32 and acting on a lever 69 connected to the limit relay spring 64. When the two forces exerted by the spotting coil 63 and the spring 64 are in equilibrium, the floating contact 61 will touch neither of the fixed contacts 65 and 66 and the pilot motor 57, 58 and motor resistance arm 55 will remain stationary. When the two forces are not in equilibrium, the floating contact 61 will be held against one or the other of the fixed contacts 65 and 66, and the pilot motor 57, 58 will rotate in the direction which will increase or decrease the resistance 54 in the traction motor circuit as required to decrease or increase the current therein as required to reach equilibrium. Thus the dynamic braking current and the retardation caused thereby will be kept proportional to the extension of the limit relay spring 64 and therefore to the lift of the dynamic brake cam 36. The cam 36 is shaped so that the retardation will vary with the depression of the brake pedal 11 as shown in Figure 3.

As the vehicle is decelerated by the dynamic braking, the voltage generated by the motors 1, 2, 3 and 4 drops towards zero, and the resistance 54 in the braking circuit must be progressively decreased to maintain the current and deceleration at the desired value. This is automatically done by the limit relay 61 to 66 and the pilot motor 57, 58 as described above. When the speed of the vehicle has dropped to five or ten miles an hour, all of the resistance 54 has been cut out, the permanent braking resistance 60, the resistance of the motors, connections, and other apparatus remains substantially constant, and no further resistance can be cut out. Therefore, as the speed continues to drop, the current in the dynamic braking circuit also drops and the dynamic braking becomes less effective or fades. It is to compensate for this decrease or fading of the dynamic braking at low speeds that a lockout is provided to cut in the air brakes just as this occurs.

The air brake lockout is operated by a cam 72 fixed to the shaft 73 which carries the motor resistance contact arm 55. The cam 72 is shaped so that it opens a switch 74 when the arm 55 has cut out all of the resistance 54 in the dynamic braking circuit and the dynamic braking has just started to fade. The switch 74 thus controlled operates a magnet valve 75 which is energized by the voltage drop across the permanent braking resistance 60 and normally cuts off the air to the brakes and vents them to atmosphere. When the switch 74 is opened, the magnet valve 75 operates to allow air to reach the brakes from a self lapping air brake valve 76 and to apply them in accordance with the setting of that valve. The brake valve 76 is set by the air brake cam 35 carried by the controller shaft 32 and acting on the valve stem 77. The valve 76 is so constructed that the pressure of the air supplied by it is determined by the position of its stem 77, and the cam 35 is shaped so that the pressure will vary with the position of the brake pedal 11 as shown in Figure 3.

The magnet valve 75 may also be controlled by the switch 38 operated by a cam on the controller shaft 32, this switch being placed in series with the air-dynamic interlock switch 74 so that opening of either switch 38 or 74 will allow the air brakes to operate. The cam on the controller shaft 32 is shaped so that it opens the switch 38 when the brake pedal 11 is depressed to its emergency position. Thus, during an emergency application of the brakes, the air dynamic interlock is rendered inoperative and the air brakes are applied irrespective of the amount of dynamic braking being obtained. As mentioned above, it may be desirable to leave the air brakes off when the dynamic braking is operative, even during emergency braking. This may be done by omitting the switch 38 and its operating cam.

In addition to the dynamic braking and air brakes, the track brakes 80 are operated by the controller by means of the arm 37. This arm revolves with the controller shaft 32 which carries it and connects the track brake coils 81 to the battery 59' through a resistance 82. As the arm continues to revolve to its extreme position, it progressively cuts out the resistance 82 until, when the brake pedal 11 is fully depressed, the full voltage of the battery 59' is applied to the track brake coils 81. The relation between the pedal position and the braking effort produced by the track brakes is shown in Figure 3, from which it will be seen that the track brakes do not begin to come into operation until the pedal 11 is past its parking latch position.

The track brakes 80 which are shown are of the type which are applied to the rail solely by the initial energization of their magnetizing coils 81.

As has been described above, depression of the brake pedal 11 to its extreme position applies all of the brakes with maximum force except as noted above. At the same time, switches 39, 45 and 44 are operated by cams on the controller shaft 32 to supply current to cause a track sander and a signal 84 to operate, and to cut off the supply of current to the control circuit of pneumatic or electric door closing motors. The door closing motors are normally operated by manual control switches but the controls are arranged so that complete cutting off of current by the switch 44 makes the motors inoperative and allows the doors to be opened by hand. This may be necessary in emergencies.

The controller 16, 17, 18, 19 operated by the foot interlock or "dead man" pedal 15 contains a switch 18 in the lead to the door closing circuits.

The switch 18 opens when the pedal 15 is fully released and allows the doors to be opened by hand in the same manner as the switch 44 in the brake controller. The opening of this circuit de-energizes the door engine supply magnet valve 92, cutting off the air supply to the door engine 93, of which there may be several. The door closing circuit is illustrated in Fig. 1a. The doors may then be pushed open by hand. When the engine 93 is normally supplied with air by opening of the valve 92 its operation is further controlled by a door control magnetic valve 94 connected to a control switch 95 on the operator's panel. When this switch 95 is closed the valve 94 is energized by the battery 59' and causes air to be admitted to the larger cylinder 96 of the engine 93, thus causing a door opening movement of the engine piston 97. The engine 93 is of conventional type with one cylinder, and hence the area of one piston, substantially larger than the other so that when exposed to the same line pressures there will be expansion in the larger cylinder. It will be understood that the pistons in the engine 93 are suitably connected to door actuating levers (not shown). Another switch 19 in the "dead man" controller opens the motive power circuit and two switches 16 and 17 connect the track brake coils 81 directly to the battery 59' and cause the signal 84 to operate. Thus, if the operator of the vehicle leaves his post or becomes suddenly incapacitated through death or other reason, the power will be cut off from the motors 1, 2, 3, 4, the track brakes 80 will be fully applied, and the doors of the vehicle can be pushed open by anyone. The signal is operated to notify the operator of inadvertent release of the foot interlock as mentioned in the first part of this specification.

What we claim is:

1. In a rail car, a brake control having an intermediate position for holding brakes applied while the car is unattended, a "dead man" control having three positions, the first of which positions permits normal operation of the car and the third of which positions causes emergency brake application, means urging the "dead man" control from the first position to the third, a latch for holding the brake control in its intermediate position, means for holding the "dead man" control in its intermediate position when said latch is engaged and for disengaging said latch when the "dead man" control is in its first position, and means for operating a signal to the operator whenever the controls are released without both being left in their intermediate positions.

2. In a rail car, a brake pedal, a foot interlock pedal, a latch for holding the brake pedal in an intermediate position, means for releasing the latch when the foot interlock pedal is fully depressed and for holding the foot interlock pedal in partially depressed position when the latch is engaged, and means for operating a signal to the operator whenever the pedals are released without both being left in their intermediate positions.

3. In a rail car, a brake control member, means for applying braking means during the first portion of the travel of said member, means for applying additional and electric braking means during the last portion of the travel of said member, and means for latching said member in a position between said two portions of its travel.

4. In a vehicle brake system, in combination, an electric brake means, a circuit for supplying current to energize said electric brake means, a control device operable to control the degree of current supplied to said brake means and having a plurality of application positions one of which is a maximum position, a by-pass circuit around said control device, a foot interlock, and a switch operated by said foot interlock to open and close said by-pass circuit to said electric braking means.

5. In a rail car, a brake pedal movable to brake applying and release positions, an interlock having a switch and a latch associated therewith, said latch being operable when said pedal is in an application position to lock said pedal in said position, said interlock being held in a spring energizing position during normal car operation and adapted to close said switch upon release, said switch controlling the flow of current to an electric braking means.

LEBERT E. BLUE.
CLARENCE F. HIRSHFELD.